Dec. 15, 1936.  O. WERNER  2,064,579
FUEL CONTROL FOR CARBURETORS
Filed May 2, 1931  2 Sheets-Sheet 1
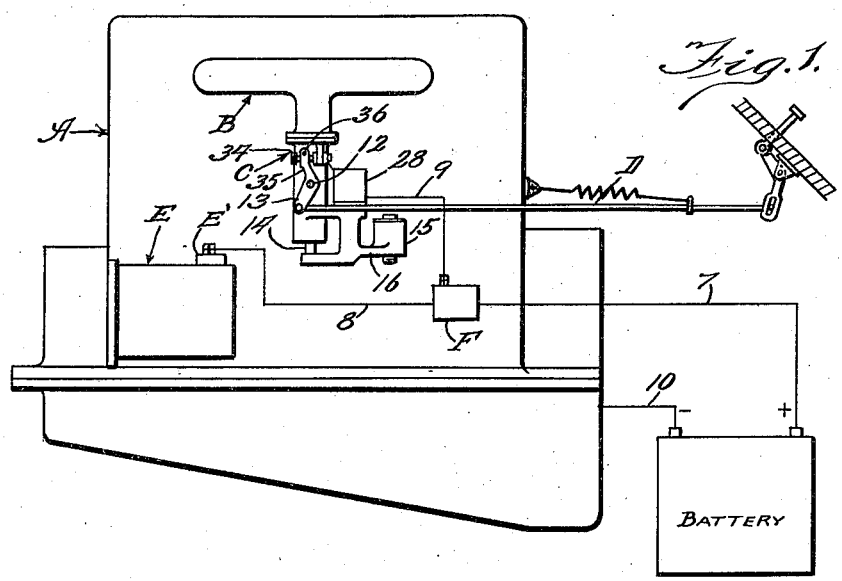
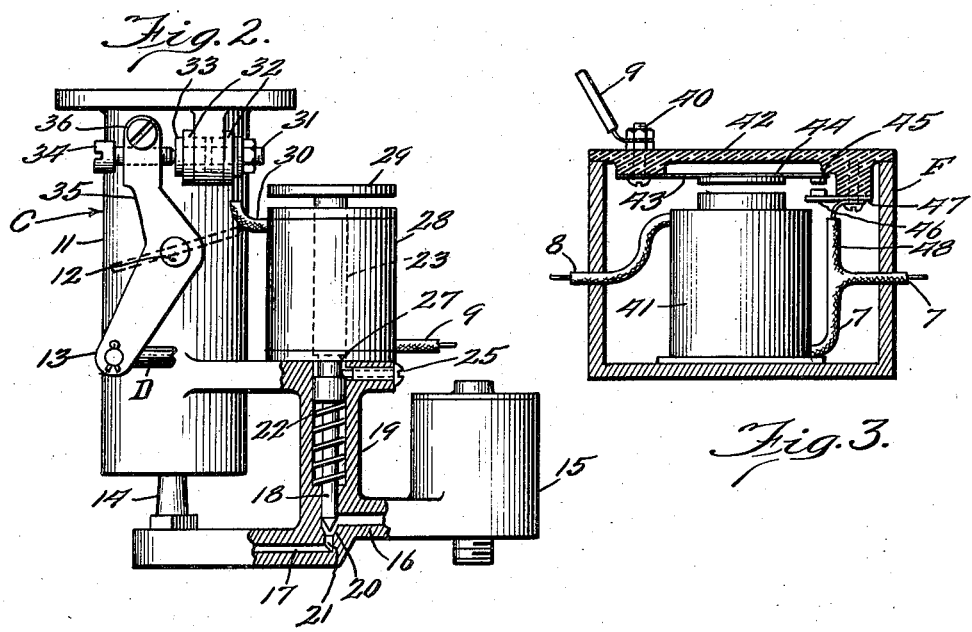
Inventor:
Oscar Werner Dec. 15, 1936.                O. WERNER                2,064,579
                    FUEL CONTROL FOR CARBURETORS
                       Filed May 2, 1931           2 Sheets-Sheet 2

Inventor:
Oscar Werner

Patented Dec. 15, 1936

2,064,579

UNITED STATES PATENT OFFICE 2,064,579

FUEL CONTROL FOR CARBURETORS

Oscar Werner, South Bend, Ind., assignor to Bendix Aviation Corporation, South Bend, Ind., a corporation of Delaware Application May 2, 1931, Serial No. 534,538

5 Claims. (Cl. 192—.01)

This invention relates to devices used for shutting off the flow of fuel to the engine while said engine is being used as a brake for slowing down the motor vehicle in motion.

A further object is to reduce the wear and tear on the engine while same is being used as a brake.

A further object is to make the braking action of the engine more effective.

Another object is to provide a device of the aforementioned character which may readily be attached to standard types of motor vehicles without altering the construction or operation thereof.

A further object is to provide a device of aforementioned character which is simple in construction and which, in case of failure, will not interfere with the normal operation of the motor vehicle.

The accompanying drawings and the following specifications are intended only as typical of the various forms which the invention may take. Other forms may suggest themselves from the specifications and claims to follow.

In the accompanying drawings—

Fig. 1 is a side elevation of an internal combustion motor vehicle engine illustrating the general arrangement of the parts entering into the invention when the operation is controlled by the throttle and the current from the generator;

Fig. 2 is a side elevation of the carburetor shown in Fig. 1;

Fig. 3 is a vertical section of the relay shown in Fig. 1;

Figure 4:
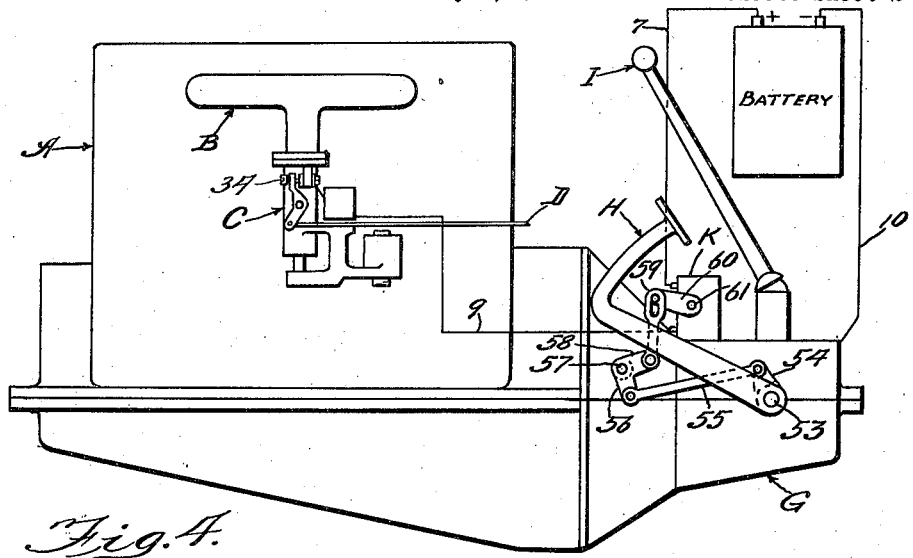
Fig. 4 is a side elevation of an internal combustion motor vehicle engine and transmission illustrating the general arrangement of parts entering into the invention when the operation is controlled by the correlation between throttle, clutch and gear shift.

Referring first to the invention as illustrated in Figs. 1, 2 and 3—

In Fig. 1 the character A denotes a motor vehicle engine of conventional type, B the inlet manifold, C the carburetor, D the rod connecting the carburetor throttle lever with hand and foot throttle, E the electric generator, E' the charging current controller, F the relay, 7 the electric cable leading from the battery to the relay, 8 the electric cable leading from the relay to the generator, 9 the electric cable leading from the relay to the carburetor and 10 the ground wire from the battery to the engine.

In Fig. 2, 11 denotes the suction tube of carburetor C, 12 the throttle shaft, 13 the throttle lever, 14 the nozzle, 15 the float chamber, 16, 17 and 21 the fuel passages leading from the float chamber to the nozzle, all of the conventional type. Valve 18 is slidably mounted in casting 19 and is adapted to come in contact with seat 20 in the vertical passage 21. Normally, however, it is held away from seat 20 by compression spring 22 acting against the bottom of enlarged upper portion 23 of valve 18.

The dog-point end of screw 25 engages recess 27 in extension 23 of valve 18 for the purpose of limiting the upward travel of the valve 18 without, however, limiting or impeding its downward travel.

Extension 23 has mounted at its upper end steel plate 29 adapted to be attracted downwardly by solenoid 28 when same is electrically energized, thus forcing valve 18 against seat 20. Lead 9 of the solenoid winding is connected with relay F as shown, while its lead 30 is connected to bolt 31 mounted in a bracket extending from the carburetor body but electrically insulated therefrom by means of fibre bushings 32 or the like. Bolt head 33 acts as a stop for idling adjusting screw 34 mounted in extension 35 of throttle lever 13 and locked in position by lock screw 36. The adjustment of screw 34 regulates the clockwise rotation of throttle shaft 12 and thereby the minimum opening of the throttle and the idling speed of the engine corresponding thereto in the conventional manner.

Screw 34 when in contact with bolt head 33 also forms an electrical connection with the engine through parts 33, 34, 35, 12, 11 and manifold B.

Relay F shown in Fig. 3 is a box-shaped metallic housing with a cover 42 made of suitable insulating material. Mounted in the housing is electro-magnet 41, its lead 7 being connected to the battery, while its lead 8 is connected to a suitable binding post on charging current controller E' so that electro-magnet 41 is in series with the lead from the generator to the battery. Spring blade 43 is bolted to cover plate 42 by means of bolts 40 and is provided with steel disc 44 near its center and with contact point 45 near its end. There is also mounted to the cover a rigid metal blade 47 in such a way that its contact point 46 is opposite to, but not normally in contact with contact point 45 of spring blade 43. Blade 47 is electrically connected to lead 7 by means of branch lead 48.

Normally blade 43 is held by its spring tension in the position shown on the drawings. However, when electric current of sufficient intensity passes through the coil of electro-magnet 41 then steel disc 44 and blade 43 are pulled downwardly by the magnet, allowing contact points 45 and 46 to touch and to establish electrical connection between leads 7 and 9 through parts 48, 47, 46, 45, 43 and 40.

As is well known, the conventional type of charging current controller E' is designed to prevent discharge of battery current into the generator and to allow flow of charging current only if the generator runs at a charging speed corresponding to a vehicle speed of about 15 miles per hour or over. Relay F will then be energized and, provided the throttle is closed at the same time so that screw 34 is in contact with bolt head 33, current will flow through lead 9, solenoid 28 and lead 30 to the carburetor and thence to the engine ground. Solenoid 28 being energized will then pull disc 29, forcing valve 18 against seat 20 and shutting off the flow of fuel from the float chamber to the nozzle 14.

However, the engine speed corresponding to such a vehicle speed of 15 miles per hour being considerably in excess of the normal idling speed of the engine, it follows that such higher engine speed required to operate relay F can be obtained at closed throttle only if the engine is in gear and is being driven past its normal idling speed by the momentum of the vehicle in motion. The flow of fuel to the nozzle will then be shut off automatically and will remain shut off until either the throttle has been opened, or else the engine speed has been sufficiently reduced to stop the flow of charging current, thus de-energizing relay F. In either case the flow of current to the carburetor solenoid will be interrupted, thus de-energizing it and automatically re-establishing the flow of fuel to the engine.

Figure 5:
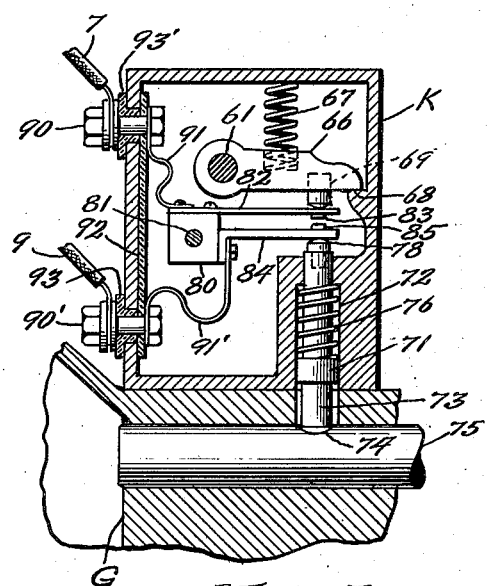
Fig. 5 is a vertical section of the control box shown in Fig. 4, and a partial vertical section of the transmission.

Another form of the invention is illustrated in Figs. 4 and 5.

In Fig. 4, character A denotes a motor vehicle engine, B the inlet manifold, D the rod connecting the carburetor—throttle lever with hand and foot throttle—G the transmission, H the clutch pedal, and I the gear shift lever, all of conventional type.

C denotes a carburetor of the type shown in Fig. 2 and described in the foregoing, K the control box more fully described below, 7 the electric cable leading from the battery to the control box, 9 the electric cable leading from the control box to the carburetor, 10 the ground wire leading from the battery to the engine. Clutch pedal H is fulcrumed on shaft 53 projecting from transmission case G and is connected through arm 54, attached to it, and through link 55 to bell crank 56 mounted on clutch shaft 57. Thus clutch pedal H when being depressed will rotate bell crank 56 and clutch shaft 57 in clockwise direction, thus releasing the motor vehicle clutch (not shown), and, bell crank 56 being connected through integral arm 58 and link 59 to lever 60 mounted on shaft 61 protruding from control box K, it will also rotate said shaft in anti-clockwise direction. Link 59 has an elongated hole at its upper end engaging lever 60, to permit lever 60 to be depressed downwardly a reasonable extent without reacting on clutch lever H.

In Fig. 5, K denotes the box-shaped housing of the control box, 61 denotes a shaft rotatably mounted in housing K and protruding through the sides thereof, and 66 denotes a lever rigidly mounted on shaft 61. Lever 66 is normally held in the position shown by compression spring 67 and stop 68 provided on housing K. Fastened in lever 66, near its end, is pin 69 made of suitable insulating material. Plunger 71 slidably mounted in bore 72 of housing K is provided at its upper end with fibre pin 78. Its lower rounded end 73 projects downwardly from housing K and is held in contact with shifter-rod 75 by compression spring 76. Said shifter rod 75, by its longitudinal forward or rearward displacement, engages the gears of the high and intermediate speeds of the vehicle respectively, such longitudinal displacement being caused by the manipulation of gear shift lever I, all in the conventional manner. Shifter rod 75 is here shown in neutral position (with the gears not in mesh) in which position end 73 drops into notch 74 of the shifter rod.

An electric contact mechanism is arranged to float between pins 69 and 78, said contact mechanism comprising fibre block 80 rotatably mounted on shaft 81 of housing K, spring blade 82 bolted to said fibre block and provided with contact point 83 at its free end, and rigid blade 84 also bolted to said fibre block and provided with contact point 85 located opposite to, but not normally in contact with contact point 83 of blade 82. Blades 82 and 84 are electrically connected by means of flexible metal strips 91 and 91' to bolts 90 and 90' respectively.

Bolts 90 and 90' are insulated from housing K through fibre plate 92 and fibre bushings 93 and 93' and serve as binding posts for electric cables 7 and 9 respectively.

The action of the device is now as follows: While gear shift rod 75 is in neutral position and the clutch is engaged, the parts of controller K are in the position shown in Fig. 5. There is no electrical connection between cables 7 and 9 and, solenoid 28 not being energized, valve 18 is in the position shown in Fig. 2 and the flow of fuel from the float chamber to the nozzle is not impeded.

If, however, shifter rod 75 is displaced longitudinally to engage the gears, then end 73 of plunger 71 is forced out of notch 74 and plunger 71 moves upwardly, tilting block 80 and blade 84 and bending spring blade 82, the free end of which is prevented from moving upwardly by lever 66 under pressure of relatively strong spring 67. Contact point 85 will now touch contact point 83 and any further upward motion of plunger 71 will merely result in tilting lever 66 and compressing spring 67, thus avoiding any possible damage to the mechanism. Electrical connection is now established between cables 7 and 9 and, provided that the carburetor throttle is closed at the same time, thus bringing screws 34 and bolthead 33 of Fig. 2 in contact, current will now flow from the battery through cables 7 and 9, through solenoid 28 to the engine ground, thus energizing the solenoid and shutting off the flow of fuel to the carburetor nozzle in the manner previously described.

The flow of fuel will remain shut off until either the throttle is opened again or else clutch pedal H is depressed, thereby declutching the motor vehicle and at the same time tilting arm 60, shaft 61 and lever 66 in anti-clockwise direction as previously described. Pin 69 of arm 66 will then leave spring blade 82, allowing it to straighten, thus breaking contact between points 83 and 85. In either case the flow of current through the carburetor solenoid will be cut off, the solenoid will be de-energized and the flow of fuel to the carburetor nozzle will be re-established.

It will be seen from the foregoing that the flow of fuel to the carburetor nozzle will be shut off only if the vehicle is in gear, the clutch is engaged and the carburetor throttle is closed, all at the same time, a condition which normally prevails only if the engine is being used as a brake for retarding the speed of the motor vehicle. If, however, lever I is shifted to neutral position, or if the throttle is opened again, or if the clutch is disengaged for the purpose of shifting gears or preparatory to coming to a full stop, then the flow of fuel is automatically re-established.

It will be apparent to those skilled in the art:

That either of the above described forms of the invention will produce the same result, namely, the saving of fuel while the engine is being used as a brake;

That this result will be produced automatically and without special aid from the operator;

That with the many stops and slow-downs necessitated by modern driving conditions, the saving of fuel resulting from the use of my invention will be considerable;

And that the failure of the device to function will not interfere with the normal operation of the motor vehicle.

It will be also apparent, to those skilled in the art, that large numbers of variations and combinations may be made in the mechanical structure and design of the mechanism and still utilize the fundamental principles of operation and structure herein explained.

I claim:

1. In combination with an internal combustion engine having an intake manifold, electrical means for controlling the flow of fuel to said intake manifold, a gear shifting device, a throttle device, and means controlled by said gear shifting device and said throttle device for controlling said electrical means.

2. In combination with an internal combustion engine having an intake manifold, a transmission device, a clutch operating device, a throttle in said intake manifold, an electrical device for controlling the flow of fuel to said intake manifold, a circuit for said electrical device, means operated by said transmission device and said throttle for closing said circuit, and means operated by said clutch operating device for opening said circuit.

3. In combination with an internal combustion engine having an intake manifold, a carburetor supplying a fuel mixture to said manifold, a fuel passage furnishing the entire supply of liquid fuel to the carburetor, a valve for closing said passage, and electrical means including a circuit controlled by the throttle for actuating said valve.

4. In combination with an internal combustion engine having an intake manifold, means for supplying fuel to said intake manifold including a throttle, electrical means for controlling the flow of fuel to said intake manifold, a transmission device, a clutch operating device, and means operated by said throttle, transmission device, and clutch operating device for controlling said electrical means.

5. In combination with an internal combustion engine having an intake manifold, a carburetor and a throttle therefor; a transmission device; a clutch operating device; an electrical device for controlling the flow of fuel to said intake manifold; a circuit for said electrical device; and means operated by said throttle; said transmission device, and said clutch operating device for opening and closing said circuit.

OSCAR WERNER.